United States Patent

[11] 3,604,657

| [72] | Inventors | Shunkichi Igarashi<br>Tokyo;<br>Takeshi Okano, Hyogo, both of Japan |
|---|---|---|
| [21] | Appl. No. | 776,455 |
| [22] | Filed | Nov. 18, 1968 |
| [45] | Patented | Sept. 14, 1971 |
| [73] | Assignee | Fuji Photo Film Co., Ltd.,<br>Ashigara-Kamigun, Kanagawa, Japan |
| [32] | Priority | Dec. 6, 1967 |
| [33] | | Japan |
| [31] | | 42/78350 |

[54] FILM END WITHDRAWING DEVICE
5 Claims, 6 Drawing Figs.

[52] U.S. Cl. .................................................. 242/195,
242/197
[51] Int. Cl. ....................................................... G11b 15/66,
G11b 23/10

[50] Field of Search............................................ 226/92;
242/195, 197, 198, 71.1; 352/157, 158, 72, 78

[56] References Cited
UNITED STATES PATENTS

| 3,104,843 | 9/1963 | Missriegler et al............ | 242/198 |
| 3,458,156 | 7/1969 | Davies et al. ................. | 242/195 X |

FOREIGN PATENTS

| 233,283 | 4/1964 | Austria......................... | 242/195 |

*Primary Examiner*—George F. Mautz
*Attorney*—Sughrue, Rothwell, Mion, Zinn & MacPeak

ABSTRACT: A pivotable, reciprocating plate having a hooked projection which enters a film magazine slot and is received within an aperture at the end of the film to forcibly withdraw the film end through an adjoining cartridge slot positioned in the path of the moving film strip end.

INVENTORS
SHUNKICHI IGARASHI
TAKESHI OKANO

BY Sughrue, Rothwell, Mion,
Zinn & Macpeak

ATTORNEYS

FILM END WITHDRAWING DEVICE

BACKGROUND OF THE INVENTION

1. Field of the Invention

The present invention relates to a film with a drawing device and more particularly, to a device which is particularly applicable for withdrawing the end of a film carried by a reel within an enclosing film magazine.

2. Description of the Prior Art

Heretofore, various devices have been applied to film magazines employed in film microreaders, 8 and 16 mm. movie projectors, tape recorders and the like to prevent the end of the film or tape from being rolled up into the film magazine when the film is rewound. For the purpose of this invention, it is noted that it is equally applicable to photographic film magazines and/or magnetic tape recorder magazines. For instance, the end portion of the film is made wider than the other portion of the film so that the film end is prevented from being rolled up completely within the film magazine, or alternatively, the end portion of the film is provided with a projection fixed thereto for this purpose. Such means are conventional and constitute the prior art, as shown in FIGS. 1A and 1B. It is noted, however, that in these prior art devices, a sudden and severe impact is exerted on the end of the film when the enlarged portion strikes the film cartridge during rewinding, and the film is in danger of being sheared or broken at this point. Further, this impact is transferred to the rewinding mechanism and adversely affects the same. Moreover, there is the possibility that the film may be caught in some of the film passages due to these projections, such as the film pressure plate, sprocket, takeup reel and the like. Therefore, special parts and devices must be provided for allowing the enlarged ends of the film to pass smoothly through the film passages. It has been almost impossible to use film magazines of the prior art type particularly with 8 mm. movie projectors involving an autoloading device due to these problems.

SUMMARY OF THE INVENTION

The present invention constitutes a film end withdrawing device wherein a hook engages an elongated slot carried at the end portion of the film, whereby the film end is forcibly ejected from the film magazine. The present invention eliminates the need for any enlargement for projection to be carried at the end portion of the film and the device is particularly applicable to autoloading of 8 mm. movie projector film and eliminates the normal manual operation of feeding the film end into the projector autoloading device.

The device is particularly useful in conjunction with a manually operated switch for causing rotation of the film in a direction opposite to that of movement of the hook to ensure engagement of the hook within the film slot.

DESCRIPTION OF THE PREFERRED EMBODIMENT

Figure 1A:
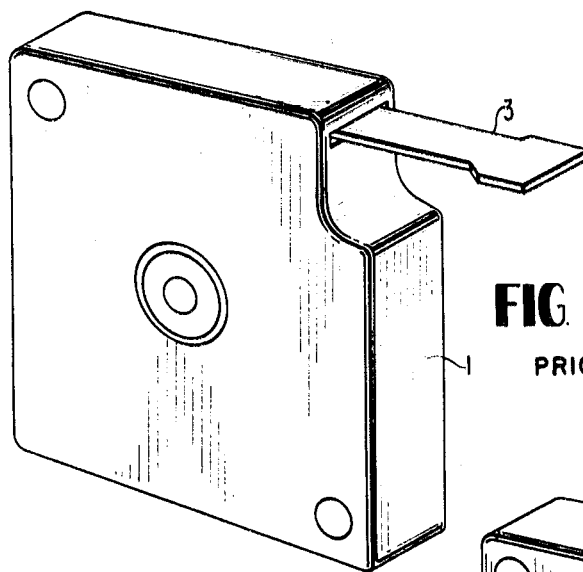
FIGS. 1A and 1B are perspective views of the conventional film magazine in which the end of the film carries projections.
Figure 1B:
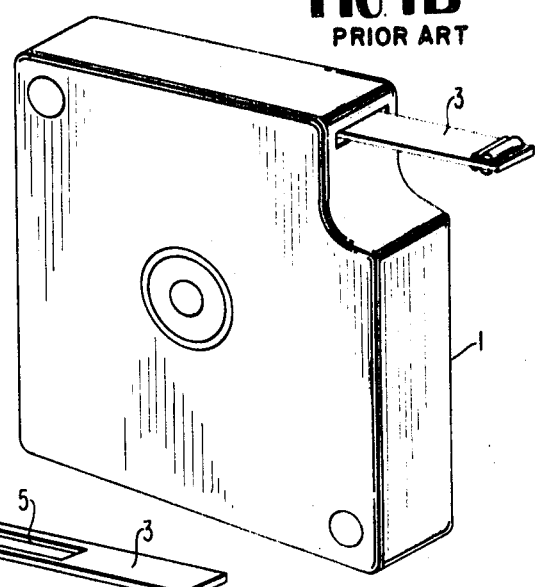
Figure 2:
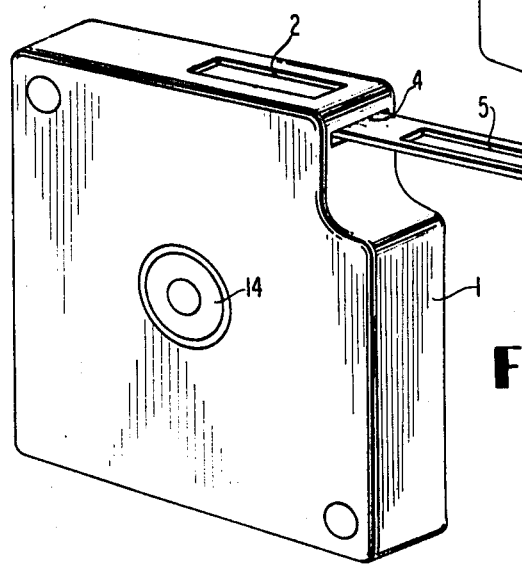
FIG. 2 is a perspective view of a modified film magazine employed with the film-withdrawing device of the present invention.

Referring to the drawings, which show a preferred embodiment of the present invention, a generally rectangular, one-cord film magazine 1, FIG. 2, is provided with an elongated slot or opening 2 on the upper wall thereof and is further provided with a narrow slot 4 on the adjacent end wall through which the end of the film 3, which is loaded within the film magazine, may be withdrawn by moving the same along a path parallel to and adjacent the upper slotted wall. The film 3 is provided with an elongated slot or perforation 5 just inwardly from the tip end of the film.

The film end-withdrawing device, which is adapted for use with the film magazine described previously, comprises mainly a frame plate 7 having an inclined, elongated slot 6 formed therein. An operating plate 9 is slidably and pivotally mounted within the frame plate 7 by means of a couple of spaced pins 11 and 11' with pin 11' carried by the plate 9 being engageable a recessed portion 12 of the slot 6 and with both pins being slidable within slot 6, the extent of sliding movement being determined by the length of the slot. It is noted that pin 11 acts as a pivot when the pin 11' is engaged within the recessed portion 12 of the slot 6 and the device is provided with a spring 10 tending to urge the operating plate 9 inwardly and about the axis of pin 11. The other end of the spring is coupled to the apparatus with which the device is used, such as projector, for instance, not shown.

The operating plate 9 is provided with a hooked projection 8 at the lower portion thereof which selectively engages with the elongated perforation or slot 5 carried by film 3 within the cartridge. The slot 6 is inclined slightly in the direction of the front end of the cartridge, that is, from left to right. This causes the projecting hook portion 8 of the operating plate 9 to move below the frame plate 7 when the operating plate 9 is moved to the right with the pins 11-11' sliding within slot 6. The position of the hook portion 8 of the operating plate is just above the left-hand end of the slot or opening 2 of the film magazine 1 when the film magazine 1 is loaded onto the projector, for instance, in such a position as to be operable with respect to the film-withdrawing device in accordance with the present invention.

Preferably, a switch 13 is disposed on the frame plate 7 and acts to control the motor (not shown) which drives the film takeup core or spool 14 carried by film magazine 1. The switch is closed when it moves out of contact with operating plate 9 and opens when the plate is brought into contact with the plate. The film takeup core 14 of the film magazine is rotated by the motor in the clockwise direction when energized, as indicated by the arrow. A capstan roller 15 and a pinch roller 16 are provided to the right of the film magazine in line with narrow slot 4 on the front face of the magazine for receiving the end of the film 3 as it emerges from the magazine during withdrawal. With the loaded magazine in position, as shown, the operating plate 9 is pushed down against the bias of spring 10 causing the hook portion 8 to move into the film magazine 1 through the elongated slot 2 and with the switch out of contact with operating plate 9, the circuit to the motor is closed and the motor drives the film core 14 in a counterclockwise direction whereby the film 3 is rotated such that its end portion slides along the inner surface of the film magazine 1 under centrifugal force. During rotation, the film end portion is caught by the projecting hook 8, which extends through the elongated slot 2 of the cartridge and moves into the elongated slot or aperture 5 of the film end causing rotation of the film 3 to cease, this state being shown in FIG. 4.

Figure 5:
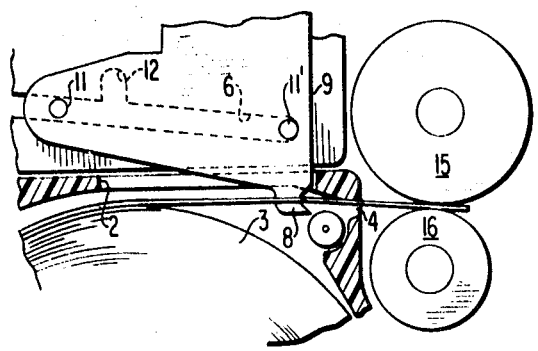
FIG. 5 is an enlarged elevational view of the device and cartridge shown in FIGS. 3 and 4 at the end of the film withdrawal stroke.

The film stops and since the torque of the drive motor is extremely small, the core rotates perhaps one additional revolution. Therefore, due to the low torque of the drive motor, there is no possibility of breaking the film 3 in the vicinity of the elongated film aperture or perforation 5. The drive motor has a very small driving torque and the motor may operate at a lower voltage than the standard voltage. Since the motor stops in less than one second, there is no need to use a torque motor. After the end of the film is caught by the hook projection 8, the end of the film is forcibly withdrawn by causing the operating plate, which now carries the end of the film, to move from left to right forcing the tip end of the film through the aligned opening 4 or slot in the forward face of the cartridge and causing the tip end of the film to move between the capstan roller 15 and the pinch roller 16, as shown in FIG. 5. At this point, the operating plate 9 is released and returns to its initial position by means of the tension spring 10. Switch 13 is opened to stop the drive motor. Subsequently, the capstan roller 15 and pinch roller 16 are rotated by operation of another switch (not shown) to feed the film into the associated movie projector, microreader, etc. Alternatively, by substituting a sprocket for capstan roller 15, the pinch roller 16 may be eliminated. In practical use, a film magazine is not necessary and the film may be readily wound upon a reel, in which case, the end of the film is presented to the film-withdrawing device in the same manner as the illustrated embodiment.

Figure 3:
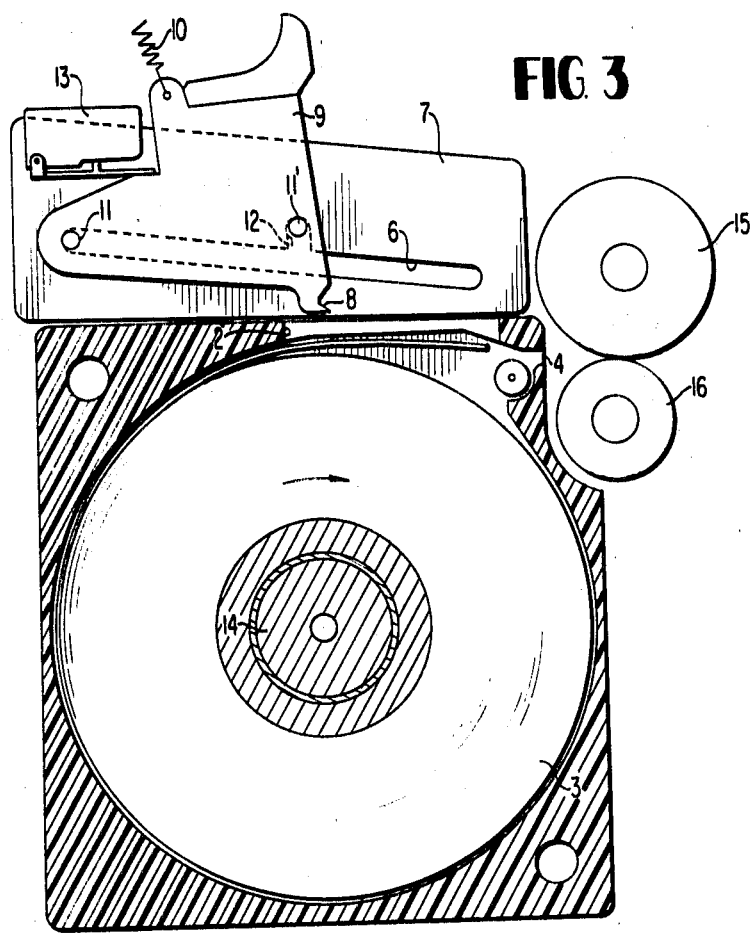
FIG. 3 is a side elevational view of the film-withdrawing device of the present invention as applied to the magazine shown in FIG. 2 with the magazine in section.
Figure 4:
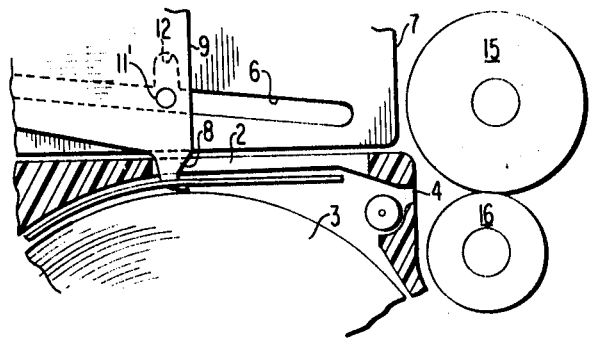
FIG. 4 is an enlarged view of a portion of the device and magazine shown in FIG. 3 with the hook projection depressed, prior to withdrawal of the end of the film.

As described above, in accordance with the present invention, the end of the film is engaged with the hook portion 8 through the use of an elongated slot or perforation 5 which is carried at the end of this film, this occurring within a single revolution of the magazine takeup core 14 subsequent to pivoting of the operating plate 9 from the position shown in FIG. 3 to the position shown in FIG. 4. After engagement shown in FIG. 3 to the position shown in FIG. 4. After engagement of the hook projection 8 with the slotted end of the film, the end portion of the film 3 may be easily inserted between the capstan roller 15 and the pinch roller 16. Since the film end is provided only with an elongated perforation which does not widen the film, nor add a projection extending from the sides thereof, there is no necessity for additional elements to ensure that the film passes smoothly through the projector. In particular, when employing the film magazine as described above, the film end, except when it is withdrawn, lies completely inside the magazine in wrapped fashion and there is no fear of damaging the end of the film or withdrawing the end portion unexpectedly or unwillingly by some device which may tax the end portion thereof. Moreover, the film can be withdrawn from the film magazine or the film reel without the operator directly touching the film, which ensures much easier film loading than the conventional autoloading-type 8 mm. movie projector that requires manual removal of the film and positioning of the same with respect to the projector drive apparatus.

The invention has been described in detail with particular reference to an embodiment thereof, but it will be understood that variations and modifications may be effected within the spirit and scope of the invention, as described hereinabove and defined in the appended claims.

We claim:

1. A device for withdrawing a film from a magazine or the like wherein the film is wrapped about a motor-driven reel carried therein for moving the film end away from an end slot, and said magazine carries a first slot formed within the end of said cartridge for allowing the end of said film to project therefrom, a second, elongated slot in another end face of said cartridge, an operating plate operatively positioned with respect to said cartridge, said operating plate having a hooked projection and means for moving said plate to cause said hook projection to extend through said second elongated slot and into engagement with said film and for longitudinal movement with said second slot to force the tip end of said film through said cartridge and first slot, and an elongated slot formed within said film adjacent the free end thereof, and a normally open switch carried by said withdrawing device for selectively energizing the drive motor to cause said film slot to underlie said hook projection.

2. The film-withdrawing device as claimed in claim 1 wherein said motor comprises a low-torque motor to prevent tearing of the end of said film strip when said hook projection is received by said film slot.

3. The withdrawing device as claimed in claim 1 wherein said means for moving said hook projection through said second elongated slot into engagement with said film and along said second elongated cartridge slot comprises a support plate fixedly positioned adjacent said second elongated cartridge slot, an inclined, elongated slot carried by said support plate and means for coupling said operating plate to said support plate for pivotal movement with respect thereto and for movement along the length of said inclined slot.

4. The withdrawing device as claimed in claim 3 wherein said coupling means comprises first and second longitudinally spaced fins fixedly carried by said operating plate and received within said inclined slot for sliding movement therein and a recess carried by said support plate to one side of said inclined slot opposite to that of said hook projection and biasing means tending to bias one of said pins in the direction of said recess, whereby said one pin, in moving relative to said recess, causes said hook projection end to enter said second elongated magazine slot to effect engagement between the hooked end of said operating plate and said apertured film, whereupon said operating plate is free to slide along said inclined slot to cause the tip end of said film to be forcibly projected through said end slot of said cartridge.

5. The withdrawing device as claimed in claim 1 wherein said normally open motor control switch is position adjacent said operating plate such that said switch is manually closed when said operating plate is pivoted in one manual operation.